(12) United States Patent
Hanson et al.

(10) Patent No.: US 6,332,085 B1
(45) Date of Patent: Dec. 18, 2001

(54) INTEGRATED TELECOMMUNICATION SYSTEM AND METHOD WITH VOICE MESSAGING AND LOCAL AREA PAGING

(75) Inventors: Dan A. Hanson, Dallas, TX (US); Kirk Topits, Roswell, GA (US)

(73) Assignee: Teleco, Inc., Greenville, SC (US)

( * ) Notice: Subject to any disclaimer, the term of this patent is extended or adjusted under 35 U.S.C. 154(b) by 0 days.

(21) Appl. No.: 08/985,981

(22) Filed: Dec. 5, 1997

(51) Int. Cl.[7] .................................................. H04B 1/38
(52) U.S. Cl. ......................... 455/557; 455/31.2; 455/413
(58) Field of Search .................................... 455/412, 413, 455/414, 415, 31.2, 31.1, 557, 556, 38.1, 555, 554, 567, 426, 458

(56) References Cited

U.S. PATENT DOCUMENTS

| | | | |
|---|---|---|---|
| 4,916,726 | 4/1990 | Morley, Jr. et al. ................. | 379/88 |
| 5,140,626 | * 8/1992 | Ory et al. ............................ | 379/57 |
| 5,187,735 | 2/1993 | Garcia et al. ........................ | 379/88 |
| 5,193,110 | 3/1993 | Jones et al. ......................... | 379/94 |
| 5,224,150 | 6/1993 | Neustein ............................. | 379/57 |
| 5,260,986 | 11/1993 | Pershan ............................... | 379/57 |
| 5,307,399 | * 4/1994 | Dai et al. ............................ | 379/57 |
| 5,327,486 | 7/1994 | Wolff et al. ......................... | 379/96 |
| 5,375,162 | * 12/1994 | Kim et al. ........................... | 379/57 |
| 5,418,835 | * 5/1995 | Frohman et al. .................... | 379/57 |
| 5,450,475 | * 9/1995 | Miyagaki ............................ | 379/67 |
| 5,471,523 | * 11/1995 | Smith et al. ........................ | 379/165 |
| 5,481,590 | * 1/1996 | Grimes ............................... | 379/57 |
| 5,493,692 | 2/1996 | Theimer et al. .................... | 455/26.1 |
| 5,548,636 | 8/1996 | Bannister et al. .................. | 379/201 |
| 5,561,703 | * 10/1996 | Arledge et al. ..................... | 379/57 |
| 5,664,003 | * 9/1997 | Foladare et al. ................... | 455/459 |
| 5,668,862 | * 9/1997 | Bannister et al. .................. | 379/201 |
| 5,737,688 | * 4/1998 | Sakai et al. ........................ | 455/31.2 |
| 5,742,906 | * 4/1998 | Foladare et al. ................... | 455/461 |
| 5,841,854 | * 11/1998 | Schumacher et al. .............. | 379/265 |
| 5,937,354 | * 8/1999 | Bala et al. .......................... | 455/459 |
| 5,953,638 | * 9/1999 | Flood et al. ........................ | 455/31.2 |
| 6,014,377 | * 8/1998 | Gillespie ............................ | 455/445 |
| 6,094,574 | * 7/2000 | Vance et al. ....................... | 455/415 |

* cited by examiner

*Primary Examiner*—William Trost
*Assistant Examiner*—Tilahun Gesesse
(74) *Attorney, Agent, or Firm*—Flint & Kim, P.A.

(57) ABSTRACT

A private telephone system and method to integrate a local paging system is disclosed which does not require an outside service provider, and at the same time, allows for ample time to effectively pick up calls which are for those away from their normal work station. The basic components of the system are a PBX/KSU switch, a plurality of telephone extension sets, a voice mail system, a local RF transmitter, and a plurality of local area pagers.

The RF transmitter of low power output (2 or 5 watt) is connected upon receiving a set of parameters from the voice mail system. The voice mail system activates only that pager (or pagers) designated to the mailbox requested based upon configuration data (an individual or group of individuals). The system and method may provide for "immediate" activation of the pager without caller intervention, or "delayed" activation of the pager which requires caller intervention.

A path for leaving voice mail messages is provided in the same mailbox that is normally used by the called party; thus eliminating the need to retrieve messages from more than one mailbox. Caller information (where available and so equipped) may be passed to alert the called party of the caller information. Department level paging (or group paging) may be provided in which more than one pager is activated from a single call.

44 Claims, 5 Drawing Sheets

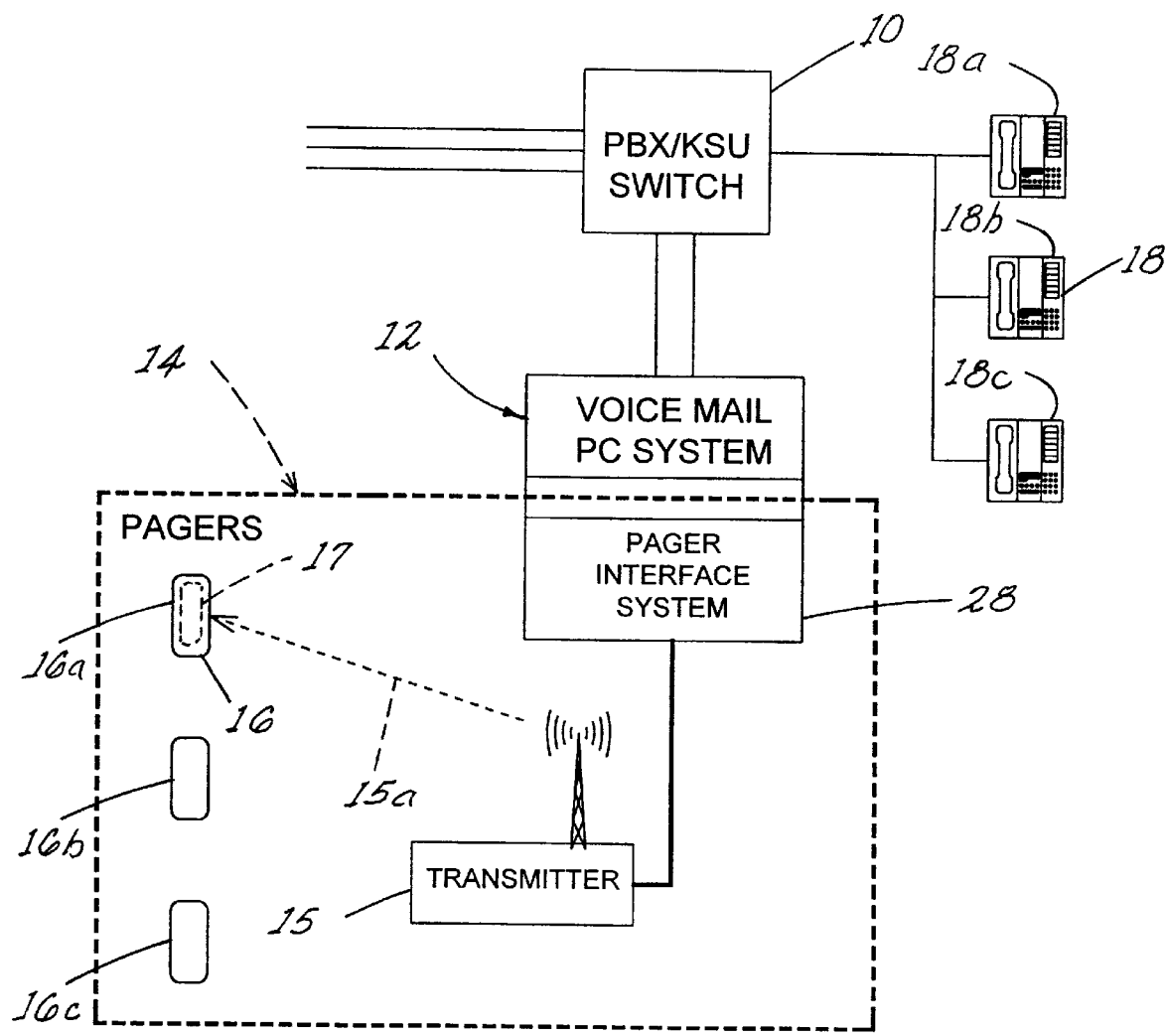
- Figure 1 -
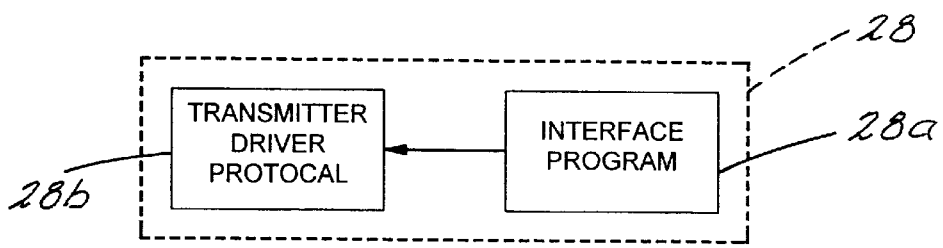
- Figure 1A -

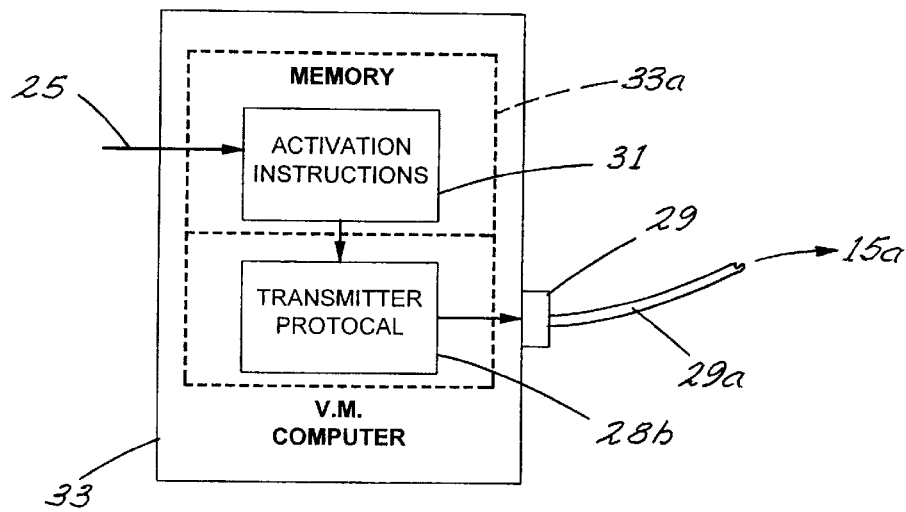
- Figure 1B -
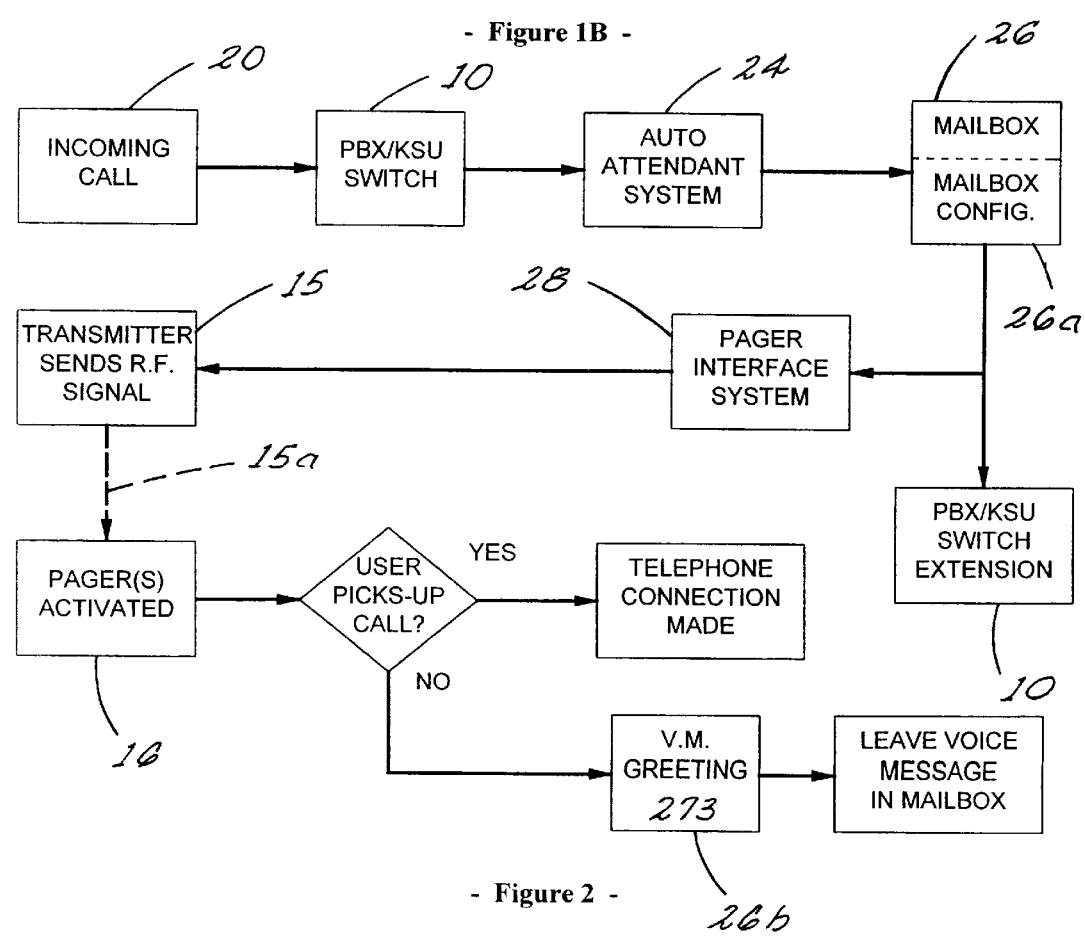
- Figure 2 -

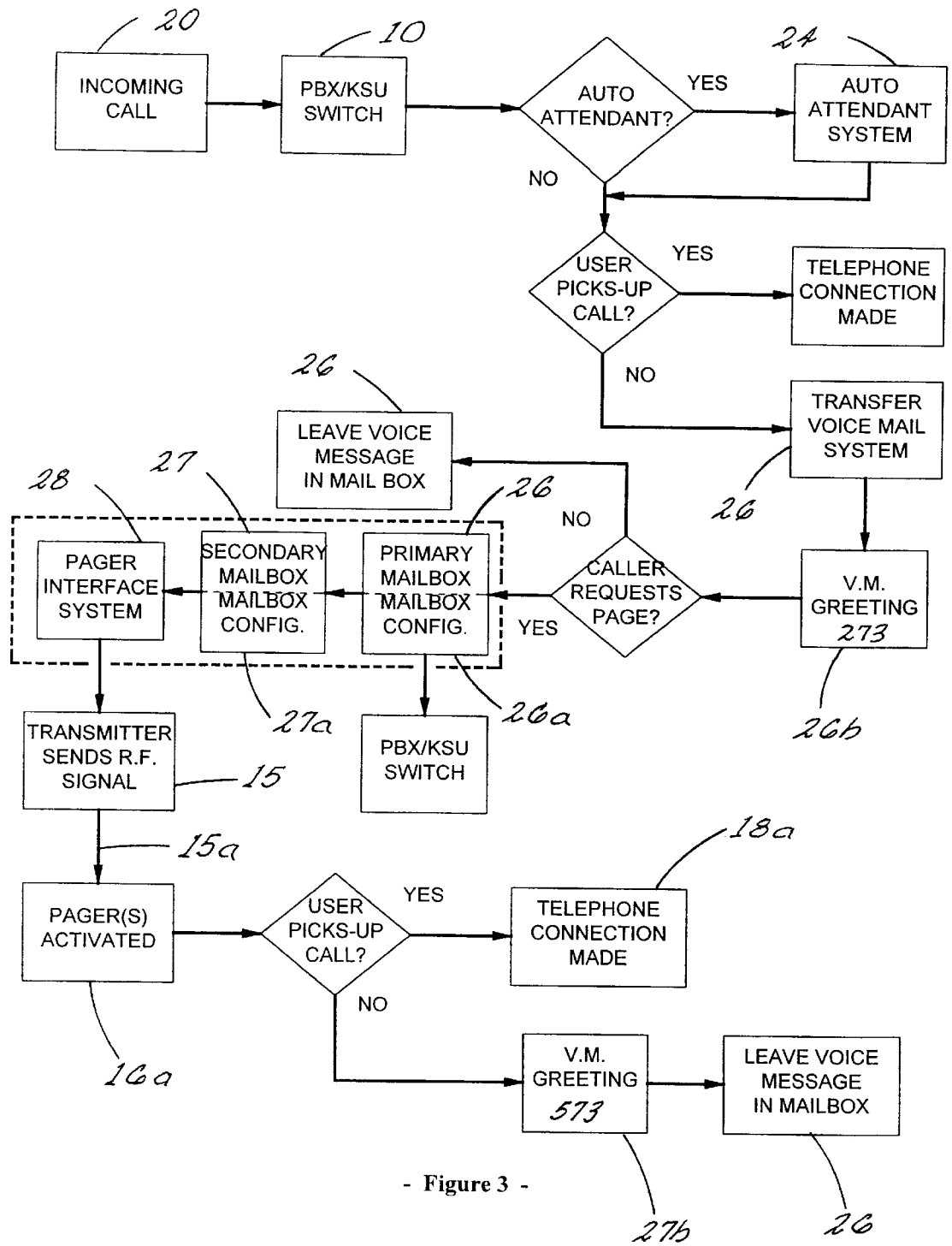
- Figure 3 -

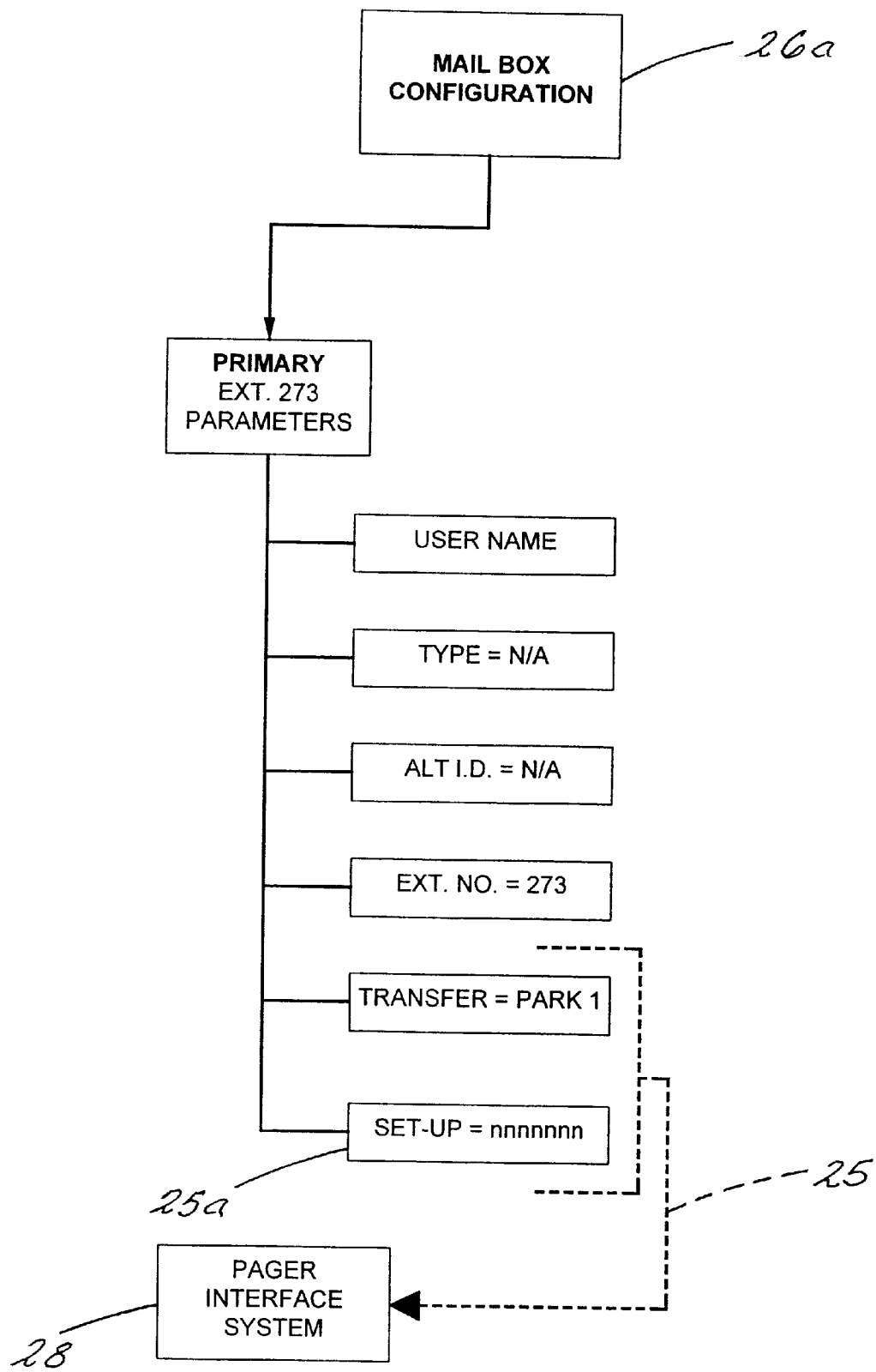
- Figure 4 -

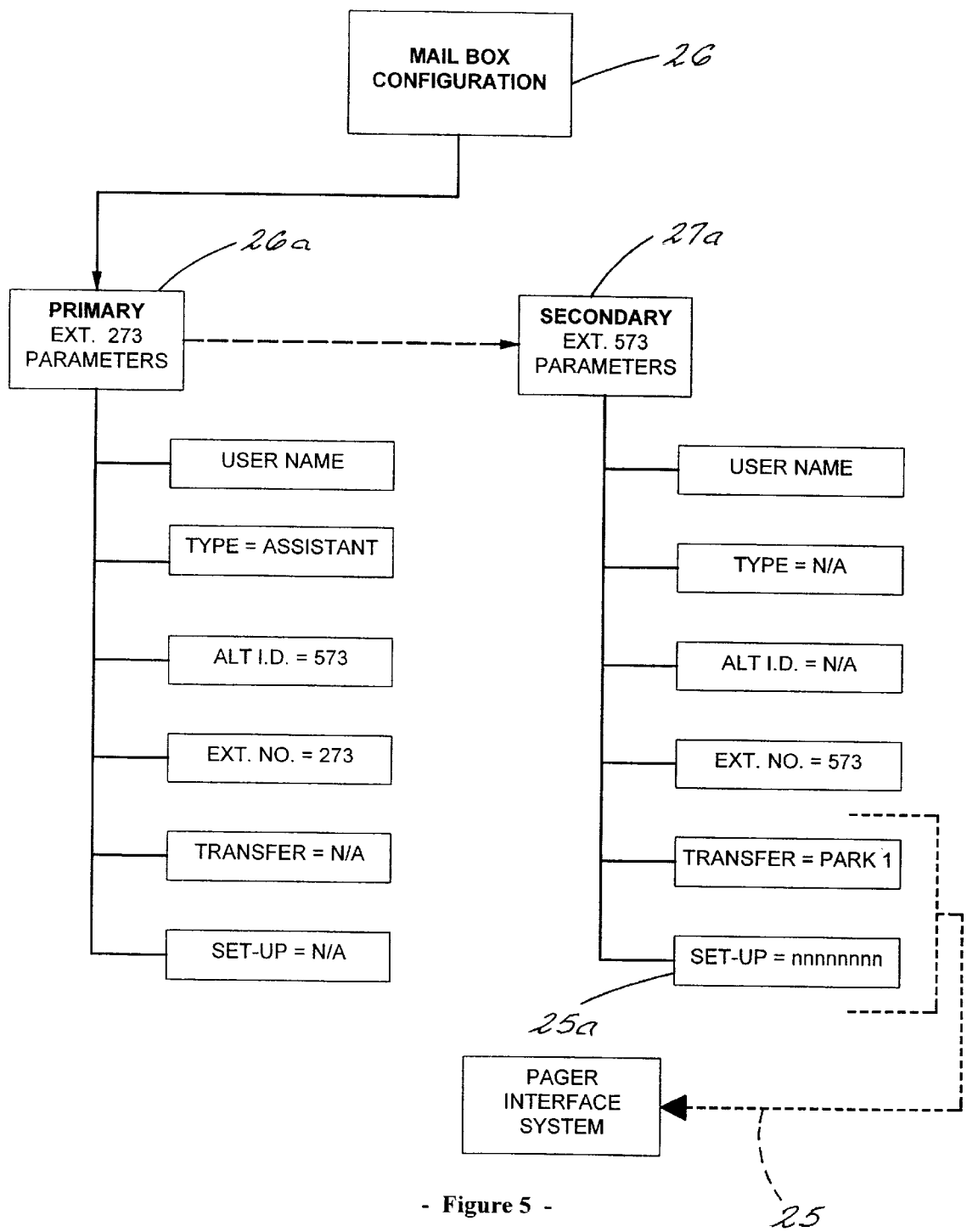
- Figure 5 -

INTEGRATED TELECOMMUNICATION SYSTEM AND METHOD WITH VOICE MESSAGING AND LOCAL AREA PAGING

FIELD OF THE INVENTION

This invention relates to telecommunication systems, and more particularly to an internal telecommunication/voice mail system having the capability of directly activating a local area pager within the system at the request of the caller without the need of an outside paging service.

BACKGROUND OF THE INVENTION

Heretofore, voice mail (or voice messaging) systems have been provided to store voice messages from calling parties when the called party cannot pick up the telephone. This occurs as a result of either the called party not being in proximity of their telephone, or, when they are on another line, and cannot break off the conversation in time to retrieve another call. When this happens, the calling party is generally prompted to leave a message.

The alternative to reaching the called party, other than voice mail, has been to either find another individual who will attempt to locate the party, either by overhead paging and/or by searching for the individual. In both cases this is time consuming, disruptive, and inefficient. In some areas, "outdoor" paging has been regulated and is illegal due to the noise pollution created. Also, in after hours situations, where others may not be available to perform the manual intervention described above; thus important or emergency calls are unanswered.

Frequently, individuals are away from their primary telephone (e.g.; meetings) or are normally situated in places where telephones are not readily accessible to their work areas (e.g.; warehouses or manufacturing areas). Callers, both internal and external, need access to these individuals in order to communicate immediately with such individuals, or at least attempt to do so.

Traditional paging systems require the caller to directly dial a remote paging service to leave a one way message, or, through the private branch exchange (PBX) or voice mail system, cause these devices to initiate the call to the paging service, and leave the message. This external notification process requires the acquisition of a paging server and fees for each subscriber of the service. Allowing for the storage of a voice message is not provided, unless, in some instances, additional expensive systems (i.e.; paging servers) are acquired which provide for such storage.

U.S. Pat. No. 5,561,703 discloses a communication system which includes voice mail, fax, e-mail, telephone, and paging systems integrated into a PBX environment. However, the system utilizes a remote, outside paging service, and the subscriber's pager notifies the subscriber whether an e-mail, voice mail, or fax message awaits.

Heretofore, the prior art has not provided a suitable private telecommunicator system that does not require an outside, subscriber based paging service, and which is flexible in that the called party can have the option of picking up a call, and require a return call.

Accordingly, an object of the present invention is to provide a suitable integrated system wherein a local area pager is utilized with a private branch exchange and voice mail system so that a called party may be notified that they may have a call and answer the call, if desired, (when at or away from their telephone) in a manner which is both inexpensive and effective, and does not require subscription to an outside pager service.

SUMMARY OF THE INVENTION

The above objectives are accomplished according to the present invention by providing an integrated telecommunication system and method having local paging capabilities which does not require an outside service provider, and at the same time, allows for ample time to effectively pick up calls which are for those away from or at their normal work station. An advantageous form of the invention includes a telephone system having a private branch exchange (PBX or PBX/KSU) connected to at least one outside telephone line for receiving incoming calls; and a plurality of individual telephone extensions connected to the private branch exchange. A voice mail system is connected to the private branch exchange for receiving the incoming call and routing the call to a telephone extension of a called party. A local pager system is interfaced with the voice mail system which includes a low-power radio frequency (RF) transmitter and a plurality of individual pagers for receiving RF activation signals transmitted by the RF transmitter under at least one specified condition. A pager interface system connects the voice mail system and the transmitter. The pager interface system includes an interface program for activating the RF transmitter in response to the incoming call to transmit the RF pager activation signal to a pager of the party. The call is routed through the PBX/KSU switch, then answered by the voice mail's auto attendant feature, and the call activates the local pager automatically or when the caller requests the system to page the called party after a predetermined number of rings of the called party's extension.

In an illustrated embodiment, a mailbox assigned to the called party in the voice mail system contains pager configuration data embodied in computer readable code. There is a processor operatively associated with the voice mail and pager interface systems. The pager interface system includes a transmitter protocol for communication between the processor and the transmitter. The pager interface program includes a set of activation instructions stored in computer readable memory for processing the configuration data and the transmitter protocol to send the pager activation signal. The processor includes a communication port for exporting the pager activation signal, and a data transmission cable connecting the communication port and the transmitter. The activation instructions include a sequence of instructions for determining whether the configuration data containing required parameters is present so that the transmitter is activated. The configuration data typically includes a pager identification code identifying a pager assigned to the called party and specifies the type of page to be sent, e.g. alpha, numeric, etc. The pager activation signal may also include caller ID data containing telephone information of the caller if the telephone and voice mail system has a SMDI device, and the pager is an alphanumeric or numeric pager. The configuration data also includes information informing the processor that the incoming call has been parked in the telephone system and the extension number to satisfy the conditions for generating the pager activation signal.

The mailbox may be configured in either an immediate paging activation mode wherein the extension and pager of the called party is activated generally simultaneously, or a delayed paging activation mode wherein the pager is activated only after the voice mail system receives a paging request from the caller. The request signal is entered by the caller in response to a first voice greeting generated by the voice mail system. The response signal may be a key input response by the caller. For this purpose, the mailbox may include a primary mailbox assigned to the called party to which the incoming call is transferred in response to a page request. In this case, the primary mailbox contains special transfer instructions. The call is then transferred to a secondary mail box assigned to the called party which contains the configuration data; and the configuration data is passed to activate the transmitter.

The voice mail system includes a second voice greeting which prompts the caller to leave a message in the called party's mailbox after the called party's pager is activated and there is no answer by the called party. A path for leaving voice mail messages is provided in the same mailbox that is normally used by the called party; thus eliminating the need to retrieve messages from more than one mailbox.

Advantageously, the system may include means for simultaneously activating a plurality of pagers assigned to a plurality of individuals belonging to predefined group so that the plurality of individuals may be paged simultaneously in response to a single paging action. For example, a plurality of sales persons may be simultaneously paged with a sales call going to the first sales person to pick up the call.

In accordance with the invention, a method of providing integrated voice mail and local area pager capabilities in a telecommunication system is also provided. The method includes routing an incoming call from a caller through a voice mail system to a telephone extension of a called party; and routing the incoming call to a mailbox assigned to the called party containing configuration data identifying a pager of the called party. Next, the method includes passing the configuration data from the mailbox to a processor; and processing the configuration data to generate a pager activation signal if the configuration data satisfies system requirements. A low-watt radio frequency transmitter wired to the voice mail system is activated using the pager activation signal to transmit a RF activation signal to the pager of the called party so that the called party may pick up a telephone extension in the telecommunication system to answer the incoming call. Advantageously, the invention contemplates processing the configuration data and a transmitter driver protocol using a computer (PC) to activate the transmitter, while parking the incoming call in the telephone system at the extension of the called party. The method prompts the caller to leave a message after the called party's pager is activated and no telephone pick up is made.

The method includes routing the incoming call to the extension of the called party and activating the pager of the called party generally at the same time; and passing telephone identification information of the caller to the pager of the called party so that the called party may determine the identity of the caller prior to answering the call. Alternately, the invention contemplates routing the incoming call to a voice mail greeting of the called party, instructing the caller to request a page; and processing the caller's request for a page by passing the request to the pager interface system for activating the transmitter and displaying caller ID; and prompting the caller to leave a message in the event the caller did not request a page.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 1 is a schematic block diagram illustrating an integrated telephone and local area pager (LAP) system according to the invention;

FIGS. 1A and 1B are block diagrams of a pager interface system which interfaces a voice mail and local area pager system according to the invention;

FIG. 2 is a flow diagram illustrating the flow of an incoming call to pager activation in an "immediate" mode;

FIG. 3 is a flow diagram illustrating the flow of an incoming call to pager activation in a "delayed" mode;

FIG. 4 is a schematic block diagram of an integrated telephone and local pager system according to the invention in an "immediate" mode;

FIG. 5 is a schematic block diagram of an integrated telephone and local pager system according to the invention in a "delayed" mode; and,

DESCRIPTION OF A PREFERRED EMBODIMENT

Referring now to the drawings, the invention will be described in more detail. As can best be seen in FIG. 1, the basic features of an integrated telecommunication system, designated generally as A, according to the invention include a private branch exchange/key sending unit switch (PBX/KSU) 10 connected to a voice mail system 12, and a local area paging (LAP) system, designated generally as 14. The LAP system includes a radio frequency (RF) transmitter 15 which transmits to one or more personal pagers 16, such as 16a, 16b, 16c, ... illustrated. The PBX/KSU is also connected to a plurality of inside telephone extension sets 18, such as extension 18a, 18b, and 18c. A number outside telephone central office (CO) lines 20 of a local or national telephone system are connected to the PBX/KSU switch to provide incoming calls.

Incoming call 22 is routed through PBX/KSU switch 10, and then answered by the voice mail's auto attendant feature. In the event the called party is unavailable, and depending on the operation mode selected, the voice mail system activates the local pager for call notification immediately, or activates the local pager after the caller requests the system to page the user, depending on which option has been requested. Standard PBX/KSU 10 typically serves a single organization, and includes a switchboard and associated equipment for switching calls between any two local extensions (e.g. 18a and 18b) or between an extension 18 and a line 22 of an outside telephone system. Additional elements and functions of voice mail system 12 integrated into the system of the present invention will be briefly described in order to facilitate an understanding of the present invention, even though such features are conventional. As can best be seen in FIG. 2, if the individual is using the "immediate" activation mode of the invention among other components, the voice mail system includes an auto attendant 24 that offers voice greetings and different call routing procedures in busy and ring-no answer conditions, and allows callers to a busy extension the option of holding. A mailbox 26 is provided which accommodates an almost unlimited number of users, as well as multiple mailboxes per user, guest message boxes, information bulletin boxes, and no-messaging extensions. An individual's primary mailbox 26 includes storage for that individual's messages, primary mailbox configuration data 26a, and a first voice mail greeting data 26b containing the individual's greeting. As can best be seen in FIG. 3, if the individual is using the "delayed" pager activation mode of the invention, the individual's mailbox will also include a secondary mailbox 27, a secondary mailbox configuration 27a, and a second voice greeting 27b. The mailbox configuration may be programmed or set by the individual user depending on the telephone and pager equipment used. For example, the configuration may include the called party's individual pager ID code or number to be activated upon request, the telephone extension number of the individual for the PBX switch to call for the call back. There is a pager interface system 28 programmed to activate transmitter 15 when the individual's pager code and other required configuration data is received from the mailbox.

Referring to FIGS. 1A and 1B, pager interface system 28 includes an interface program 28a and a transmitter protocol or driver 28b which activate transmitter 15. Interface program 28a receives the mailbox configuration data 26a (or 27a), and if the required data values are present, as a specified condition, activates transmitter driver 15. The protocol may be any suitable industry standard communication port driver that sends a signal throughout the computer's buss at the appropriate IRQ and address which transmitter 15 is attached to. In the illustrated embodiment, transmitter 15 is connected to a standard RS 232 serial port 29 of the voice mail computer 33 by means of a cable 29a. Any suitable computer program may be provided at 28a to process the mailbox configuration data and call information and use the driver protocol to activate the transmitter and transmit pager activation signal 15a. Interface program 28a is stored in a computer readable memory 33a such as an EPROM, hard drive, or floppy disk, and includes activation instructions 31 embodied in machine readable code which are processed by a processor of a computer 33 typically utilized in a voice mail system. Activation instruction 31 includes a sequence of instructions to determine if the configuration data and other values found in the mailbox configuration of the called party are present to satisfy the requirements for activating the local transmitter and the pager of the party, as set forth more fully in connection with FIGS. 4 and 5 below. The processor, or computer 33, processes the data string 25 containing the configuration data 26a and using protocol 28b transmits activation signal 15a for activating transmitter 15 and pager 16 of the called party. The provision of a suitable program is well within the purview of one skilled in the art having the teachings of the present invention in his possession. For example, such a program for the embodiment of FIGS. 4 and 5 is available from Teleco, Inc. of Greenville, S.C.

Using the functionality and interface provided between PBX/KSU 10 and voice mail system 12, the LAP system 14 provides a real-time system and method for pager notification of individuals as part of the call process.

In the illustrated embodiment, the calling party reaches the called party or business and enters the individual telephone extension upon request of auto attendant 24. If an individual answers the company's incoming calls, he/she transfers the call by dialing the extension; the result is still the same. One of two events occurs, depending upon whether the called party's mailbox is configured in an "immediate" or "delayed" mode of pager activation.

Referring to FIG. 2, a flow diagram illustrates the flow of an incoming call in accordance with the system and method of the present invention in an "immediate" activation mode. The incoming call at 20 is answered by the auto attendant and upon entering the called party's extension, two events occur simultaneously. First, the extension is dialed, and, second the call is transferred to the voice mail system mailbox 26. Mailbox 26 is configured to pass call information and parameters to activate LAP transmitter 15. The transmitter sends an RF pager activation signal 15a to a specific pager 16a assigned to the individual "owner" of the mailbox. The extension number is also the mailbox number for identification and communication. The pager activates (either by tone or vibration) and the caller I.D. information (if passed by the central office) and extension 18a of the called party is displayed at the LCD 17 of pager 16a. The called party may go to any telephone in the system and pick up the call. If the call is not picked up in a specified period of time, then the user is prompted to leave a message in mailbox 26.

FIG. 3 illustrates the flow of an incoming call with the system in the "delayed" activation mode. PBX/KSU 10 begins to ring the extension number dialed, which after a specified number of rings, and assuming that the caller does not pick up the call, transfers the call to voice mailbox 26. The mailbox greeting has been configured and recorded (by the user) for the caller to either leave a message, or press a key to page the called party. Pressing the key activates secondary mailbox 27. When secondary mailbox 27 is engaged, call information and required parameters are passed to activate the LAP transmitter 15. The transmitter sends pager activation signal 15a to a specific pager 16 assigned to the individual "owner" of the primary and secondary mailboxes. The pager activates either by tone or vibration. The called party may go to any telephone in the system and pick up the call. If the call is not picked up in a specified period of time, then the user is prompted to leave a message.

An example of specific individual mailbox configuration data required for the system will now be described for the "immediate" or "delayed" mode of pager activation, as determined by the individuals initial mailbox set-up. The configuration data is for a TELECO® UST DK phone system distributed by Teleco, Inc. of Greenville, S.C. using a 2-watt transmitter and pager distributed as part nos. PGE-112 and PG001, PG002 or 100, respectively, by Wave Ware Technologies of Richardson, Tex. Low power 5-watt transmitter and pagers from the same source, may also be used. In either mode, an incoming call is typically answered by voice mail auto attendant 24 where the called party's extension number is entered.

FIG. 4 illustrates basic mailbox configuration requirements for "immediate" pager activation. In essence, the incoming call signal is routed simultaneously to the called party's extension and pager. For the primary mailbox 26 having an extension number of 273, the following configuration data is used:

TYPE=Not Applicable
ALTERNATE I.D.=Not Applicable
EXTENSION NO.=273
TRANSFER=Park 1
SET-UP=baud rate, type of pager (numeric or alphanumeric), and unique CAP identification code for the individual's pager.

In the immediate mode, the settings TYPE="Not Applicable" and ALTERNATE ID="not applicable" in mailbox configuration 26a sets the system in the intermediate mode. There is no "personal assistant" (e.g. voice greeting) or secondary mailbox for the specific called party. EXTENSION NO.=273 is the mailbox and extension of the called party. The setting TRANSFER=Park 1 parks the incoming call at extension 273 in the telephone system. The incoming call is parked until the phone is picked up, or the call is returned to the auto attendant after an appropriate time out. If a setting TRANSFER=default exists the LAP system is deactivated. The communication system acts like a normal voice mail system, i.e. only the called party's extension will ring. The SET-UP data string, including the baud rate, the type of page and the called party's pager code, is passed from the mailbox to interface program 28. Receipt of the TRANSFER=Park 1 and SET-UP data string values 25 satisfies the requirements for program 28a and protocol 28b to activate transmitter 15 and the called party's pager 16. The SET-UP data string 25a is contained in activation signal 15a, and the unique CAP code is programmed into a specific pager so that only one pager will receive the signal. Any caller ID information passed by the central voice mail system is also contained in the activation signal transmitted to the user's pager. The following is an example of a suitable voice mail greeting for the above immediate configuration:

Mailbox 273 Greeting:

You have reached John Smith of TELECO. I am currently away from my desk, however if this is an emergency, press 1 now, and you will activate my local area pager. Otherwise, leave your name, telephone number, and a message at the tone, and I'll return your call as soon as possible. Thank you for calling TELECO.

FIG. 5 describes the key activation requirements for "delayed" mode of operation. In essence, instead of an incoming call signal being simultaneously routed to the called party's extension and pager, the call is routed first to the called party's primary mailbox and greeting, and the caller is given a choice of paging or leaving a message for the called party. The called party's primary mailbox configuration 26a is configured as follows:

TYPE=Assistant

ALTERNATE I.D.=573 (example)

EXTENSION NO.=273 (example)

TRANSFER=Not Applicable

SET-UP=Not Applicable

The called party's secondary mailbox configuration 27a is configured as follows:

TYPE=Not Applicable

ALTERNATE I.D.=Not Applicable

EXTENSION NO.=573 (example)

TRANSFER=Park 1

SET-UP=baud rate, pager type, and unique pager CAP identification code for the individual.

In the delayed mode of operation, the settings TYPE="assistant" and ALTERNATE ID="573" in primary mailbox configuration 26a set the system in the delayed mode. This tells the system that there is a "personal assistant" (e.g. voice greeting) and secondary mailbox 27 for the specific called party, and there is a special transfer of the call to secondary mailbox 27 at the extension number specified in the ALTERNATE ID number field, which in the example is "573." Since the call is transferred to the secondary mailbox, there is no TRANSFER or SET-UP data in the primary mailbox configuration, and both fields are set to "not applicable". The configuration of secondary mailbox 27 is essentially the same as the configuration of primary mailbox 26a in the immediate mode illustrated in FIG. 4. In the configuration of secondary mailbox 27, TYPE=not applicable, means no special transfer occurs from the secondary mailbox. With the setting TRANSFER=Park 1, the incoming call is parked in the telephone system until it is picked up or is returned to voice mail after appropriate time-out. The SET-UP data string 25a includes baud rate, type of page, and unique pager CAP identification code. The TRANSFER SET-UP data values in the secondary mailbox configuration meet the requirements for generating pager activation signal 15a.

The following are examples of suitable voice mail greetings for the above delayed configuration:

Mailbox 273 Greeting:

You have reached John Smith of TELECO. I am currently away from my desk, however if this is an emergency, press 1 (which internally dials "573") now, and you will activate my local area pager. Otherwise, leave your name, telephone number, and a message at the tone, and I'll return your call as soon as possible. Thank you for calling TELECO.

Mailbox 573 Greeting:

You have reached John Smith's pager. I am sorry that I could not answer your page. Please leave your name, telephone number, and a message at the tone, and I'll return your call as soon as possible. Thank you for calling TELECO.

The local transmitter, shown in FIG. 1, is configured and wired to the back of the voice messaging PC platform. It utilizes serial port 29, and is normally configured to an available COM channel, IRQ, and address. These are defined in the voice messaging system level parameters. Upon a signal 15a from the voice messaging system, the transmitter activates and sends an RF activation signal 15a to the pagers based on the SET-UP field information 25.

The system may also include means for simultaneously activating a plurality of pagers assigned to a plurality of individuals belonging to predefined group so that the plurality of individuals may be paged simultaneously in response to a single paging action. For example, a plurality of sales persons may be simultaneously paged with a sales call going to the first sales person to pick up the call. This may be accomplished by setting the pager of each individual in the group with the same CAP code. The group would in essence have a common mailbox assigned in the system. Upon entering the proper key in response to a greeting prompt, all the pagers with the same CAP code would be activated. Typically, a pager may have two CAP codes so that the second code may be set to an individuals unique mailbox number, i.e. extension.

EXAMPLE

The following describes an example of how the LAP system works on the Perfect Voice™ family of telecommunication systems, including Perfect Voice and Perfect Voice Office, distributed by Teleco, Inc. of Greenville, S.C., when integrated with a Teleco® UST DK phone system.

Transmitter 15 is installed on an available DB9 COM port on the Perfect Voice™ system. The LAP is enabled on a per user basis in SCREENS. An alternate user ID and phantom DN is set up for the user. When the LAP user is paged, transmitter 15 sends out a signal to the user's pager 16, notifying them of an incoming call. If SMDI is utilized and the user has an alphanumeric or numeric pager, caller ID information is included on the pager's display. The user can then pick up the call from any telephone. The following is an example of how the LAP system works on a Teleco® UST DK phone system in the delayed mode for user ID 273 who is set up with their Personal Assistant set to extension 573:

Caller dials extension 273, does not get an answer, call forwards to voice mail.

Caller hears user ID 273's personal greeting: " . . . if you want to page me, press 1 . . . " ("1" is the digit set up for Personal Assistant).

Caller presses 1 to page user.
User's pager is activated.
Extension 573 (Phantom DN) rings.

Two possible scenarios:
- User picks up page by pressing: Intercom #5 #2 573, or
- Page is not picked up. Call forwards to voice mail secondary mailbox of the called party, and caller hears the personal greeting for Alternate ID 573 which says something like "I was unable to pick up my page, please leave a message . . . " Messages for Alternate ID 573 are pooled to the primary extension, 273, so user can retrieve all messages from one box. It is also possible for callers to dial 573 to directly ring the phantom DN and page the user, if the alternate ID is known to the caller.

Thus, it can be seen that an advantageous construction can be had for a private telecommunication system which employs a local area pager (LAP) system in an integrated manner that allows a called party to be paged on a beeper when they receive an incoming call either at or away from their desk and telephone. With an approximate range of two miles, the LAP system is ideal for users who are often away from their desk or out of range of the operator overhead/PBX page, such as employees at a car dealership or large manufacturing facility. When paged, users may pick up the call from any phone by dialing a few digits. If the phone system supports caller ID or ANI, the LAP system passes the information on to the pager which allows the user to effectively manage calls. The user is able to recognize and pick up the crucial call they may be expecting, while less-critical calls can go directly to their voice mail. The user never miss an important call and their callers are never aware they have been screened. In addition, the LAP system eliminates the recurring monthly charges that are associated with most outside paging services. For hardware, the LAP system requires one paging transmitter per system and one beeper for each user enabled for the LAP system. For software, the LAP system requires Perfect Voice Release 4.1 or higher, Perfect Voice Office, Release 1.0 or higher, and the LAP system is available from Teleco, Inc., or on any new Perfect Voice or Perfect Voice Office system of Teleco, Inc. Also, for caller ID functionality, Perfect Voice requires SMDI integration with a phone system offering caller ID.

In large manufacturing facilities management and staff are seldom stationary at a desk to receive calls. The noise in a production facility usually makes overhead paging or cordless phone technology impractical. The LAP technology is efficient because it gives callers the option of leaving a message or directly paging the called party. The LAP system then puts the caller on hold and uses the LAP technology to immediately activate the pager of the called party. With caller ID, the called party can determine who is calling, then either pick up the call from any phone on the system or allow the call to forward to voice mail.

In automotive car dealerships the salesperson is usually on the lot working with a prospective customer and is repeatedly paged over the outdoor paging system. The local annoying page interferes with the salesperson's effort to service the customer he/she is with and offers no information as to the importance of the call. With the LAP system and caller ID, the salesperson is able to discretely identify who is calling and decide if the call warrants an interruption. This not only makes the salesperson more effective and successful, but also improves the ambiance of the dealership by eliminating the loud annoyance of outdoor paging. The LAP system is also an excellent solution where local ordinances have prohibited outdoor paging.

The LAP system offers two distinct advantages to hospitality and resort facilities. These types of businesses are often large campus environments with several units and buildings. With the LAP system employees not only have the ability to prioritize their calls, as previously explained, but also they can be discretely paged anywhere on the grounds. From any phone, employees have the ability to activate the pager requesting a call back, with varying degrees of urgency. Additionally, room status is easily obtained by the front desk personnel by paging the appropriate housekeeping staff; as opposed to the expensive inefficient 2-way radio systems where they would call a housekeeping manager, who must physically check a room, then call back on the unsecured 2-way radio which may be overheard by the guest at the front desk. The ability to discretely page staff could be extended to bell captains, porters, and maintenance staff if desired.

In a retail environment the LAP system enables these facilities to set up separate user IDs for the different departments (appliances, women's clothing, hardware, etc.) and give beepers to all employees working that day. When electronics receives an incoming call, beepers go off for all employees working in the electronics department. The first one to pick up the call gets the sale. The pagers may also be set up to distinguish between different mailbox configurations. For example, the same pager may be set up to give off one long tone when callers select the electronics department mailbox and four tones when callers select a specific employee's personal mailbox (e.g., 573). In addition, the LAP system creates a more enjoyable environment for shoppers and employees because it eliminates the annoyance of overhead paging announcements and ringing phones.

In these applications, the caller may either; (a) attempt to contact the called party directly via the pager, or, (b) attempt to contact the called party after responding to a voice mail message that the called party is not available. In the case of either (a) or (b), the called party may optionally pick up the telephone call from any available telephone extension (system dependent) upon receiving notification on the pager that someone is calling. This notification may be either a vibration or audible signal emitted from the pager.

The advantages of the system of the present invention, among others, are as follows:

1. No third party paging service and associated fees are necessary for each and every user as normally required in a traditional paging system.

2. The incoming call is initially routed to the user's telephone extension, and dependent upon the options described in (a) and (b) above, may be answered after the pager activates (or after the telephone rings and subsequent pager notification).

3. In either the case of (a) or (b), if the call is not answered, the caller may leave a voice message in the called party's voice mailbox.

4. Department paging is available which activates multiple pagers from a single call; thus allowing a group of individuals to respond.

While a preferred embodiment of the invention has been described using specific terms, such description is for illustrative purposes only, and it is to be understood that changes and variations may be made without departing from the spirit or scope of the following claims.

What is claimed is:

1. An integrated telecommunication system having local paging capability comprising:
   a telephone system having a private branch exchange connected to at least one outside telephone line for receiving an incoming call;
   a plurality of individual telephone extensions connected to said private branch exchange;

a voice mail system connected to said private branch exchange having a computer with a set of computer readable instructions for receiving said incoming call and routing said call to a telephone extension of a called party;

a local pager system integrated with said voice mail system, and said local pager system including a radio frequency (RF) transmitter and a plurality of individual pagers for receiving RF activation signals transmitted by said RF transmitter under at least one specified condition;

a pager interface system integrated with said voice mail system and said local pager system; and said pager interface system have an interface program stored in a computer readable medium on said voice mail computer, said interface program including a set of computer readable instructions responsive to said specified conditions for activating said RF transmitter in response to said incoming call to transmit said RF pager activation signal to a pager of the called party.

2. The system of claim 1 including:

a mailbox assigned to the called party included in said voice mail system, said mailbox containing pager configuration data embodied in computer readable code;

a processor operatively associated with said voice mail and pager interface systems;

said pager interface system including a transmitter protocol for communication between said processor and said transmitter; and said pager interface program being stored in computer readable memory containing a set of activation instructions for processing said configuration data and said transmitter protocol to send said pager activation signal.

3. The system of claim 2 wherein said processor includes a communication port for exporting said pager activation signal, and a data transmission cable connecting said communication port and said transmitter.

4. The system of claim 2 wherein said activation instructions include a sequence of instructions for determining whether said configuration data contains required parameters as said specified condition so that said transmitter is activated.

5. The system of claim 4 wherein said configuration data includes a pager identification code identifying a pager assigned to the called party.

6. The system of claim 5 wherein said configuration data includes a type of page to be sent to the called party's pager.

7. The system of claim 6 wherein said pager activation signal includes caller ID data containing telephone identification information of the caller.

8. The system of claim 6 wherein said type of pager is one of an alpha pager, a numeric pager, a tone pager, and a vibration pager.

9. The system of claim 4 wherein said configuration data includes information informing the processor that the incoming call has been parked in the telephone system and the extension number.

10. The system of claim 1 wherein said specified condition includes a request signal entered by the caller to page the called party in response to a voice inquiry generated by the voice mail system.

11. The system of claim 10 wherein the request signal includes one of a key input and voice input response by said caller.

12. The system of claim 1 wherein said voice mail includes a mailbox assigned to the called party, and said mailbox containing pager configuration data identifying said pager of the called party which is said specified condition.

13. The system of claim 12 wherein said voice mail includes:

a primary mailbox assigned to the called party to which said incoming call is transferred in response to a first predetermined condition, said primary mailbox containing special transfer instruction data;

a secondary mail box assigned to the called party containing said configuration data to which said call is transferred from said primary mailbox; and said configuration data being passed to activate said transmitter.

14. The system of claim 13 wherein said voice mail includes a first voice greeting which prompts the caller to respond by one of a voice message left in the called party's mailbox and a request to page the called party; and said first predetermined condition being satisfied by the caller selecting the page request.

15. The system of claim 14 wherein said voice mail includes a second voice greeting which prompts the caller to leave a message in the called party's mailbox after said called party's pager is activated and there is no answer by the called party.

16. The system of claim 1 including a caller identification device configured between said voice mail and telephone system for generating a caller ID data containing telephone identification information of the caller for transmission by said RF transmitter to the pager of a called party with said RF activation signal.

17. The system of claim 1 wherein said interface system activates said transmitter to transmit said RF activation signal in response to one of a voice prompt and a telephone key prompt by the caller received by said voice mail system.

18. The system of claim 1 including means for simultaneously activating a plurality of pagers assigned to a plurality of individuals belonging to predefined group so that said plurality of individuals may be paged simultaneously in response to a single paging action.

19. The system of claim 1 wherein said mailbox may be configured in one an immediate paging activation mode wherein said extension and pager of the called party or activated generally simultaneously and a delayed paging activation mode wherein said pager is activated only after the voice mail system receives a paging request from the caller.

20. An integrated telecommunication system having voice mail and local paging capability comprising:

a telephone system having at least one extension connected to at least one outside telephone line for receiving an incoming call;

a voice mail system connected to said telephone system and having a voice mail computer with a set of computer readable instructions for receiving the incoming call and routing the call to an extension of a called party;

a local pager system integrated with said voice mail system and having at least one pager assigned to the called party, and said local pager system a local radio frequency transmitter wired to said voice mail system; and a pager interface system integrated with said voice mail system and said local pager system and receiving a notification signal from said voice mail system of the incoming call for generating a pager activation signal which is transmitted by said RF transmitter to activate said pager of the called party under specified conditions, said pager interface system having an interface program stored in a computer readable medium on the voice mail computer and having instructions responsive to specified conditions for activating the RF transmitter.

21. The system of claim 20 including means configured to pass telephone information of the caller for transmission with to an activated pager; and means for displaying the caller identification information at the activated pager so that the called party may ascertain the identify of the caller before picking up the call.

22. The system of claim 20 wherein said voice mail system includes a mailbox assigned to the called party, said mailbox containing pager configuration data identifying said pager of the called party, and said specified conditions being met by required configuration data being present in the system.

23. The system of claim 22 wherein said mailbox may be configured in one of an immediate paging activation mode wherein said extension and pager of the called party are activated generally simultaneously and a delayed paging activation mode wherein said pager is activated only after the voice mail system receives a paging request from the caller.

24. The system of claim 23 wherein said voice mail system includes means for prompting the caller to leave a message or request that the called party be paged if the call is not picked up in said delayed mode of activation.

25. The system of claim 22 including:

means for producing a voice mail greeting when said incoming call is transferred to a primary mail box of the called party configured to instruct the caller to respond by one of leaving a message in the called party's mailbox and requesting that the called party be paged; and means for activating a secondary mail box when the caller requests that the called party be paged; and means for passing said configuration data from said secondary mailbox to said pager interface system to activate said RF transmitter upon determining that said configuration data satisfies said specified conditions.

26. The system of claim 22 wherein said interface system includes:

a driver protocol for activating said local RF transmitter;

a program containing activation instructions stored in a computer readable medium for processing said configuration data and said driver protocol to generate said pager activation signal in response to said notification signal containing said configuration data.

27. A method of providing integrated voice mail and local area pager capabilities in a telecommunication system comprising:

routing an incoming call to a telephone extension of a called party;

retrieving configuration data identifying a pager of the called party automatically in response to said incoming call;

passing said configuration data to a processor;

processing said configuration data in said processor and generating a pager activation signal in response to said configuration data satisfying system requirements; and activating a radio frequency transmitter wired to said voice mail system using said pager activation signal to transmit a RF activation signal to said pager of the called party so that the called party may pick up a telephone extension in the telecommunication system to answer the incoming call.

28. The method of claim 27 specifying a code which identifies the pager assigned to the called party and the type of page to be sent to the called party in said configuration data; and processing said configuration data and a transmitter driver protocol to activate said transmitter for transmitting said pager activation signal.

29. The method of claim 27 including processing information from said voice mail system containing caller telephone information and sending the caller telephone information to the pager with the pager activation signal.

30. The method of claim 27 including parking the incoming call in the telephone system at the extension of the called party while generating said pager activation signal.

31. The method of claim 27 including prompting the caller to leave a message after the called party's pager is activated and no telephone pick up is made.

32. The method of claim 27 including routing said incoming call to said extension of the called party and activating said pager of the called party generally at the same time.

33. The method of claim 32 including passing telephone identification information of the caller to the pager of the called party so that the called party may determine the identity of the caller prior to answering the call at said extension.

34. The method of claim 27 including routing said incoming call to a voice mail greeting of the called party, and instructing the caller to request a page; and processing the caller's request for a page by passing said request to the pager interface system for activating said transmitter.

35. The method of claim 34 including prompting the caller to leave a message in the event the caller did not request a page.

36. The method of claim 35 including prompting the caller to leave a message after the called party's pager is activated and no telephone pick up is made.

37. The method of claim 27 including providing a primary mailbox configuration containing information for transferring the call to a secondary mailbox containing said configuration data for generating said pager activation signal; and providing a voice mail greeting to the caller in response to the incoming call being transferred to the secondary mailbox configuration to prompt the caller to either request a page or leave a message.

38. The method of claim 27 including providing a mailbox which may be configured in one of an immediate paging activation mode wherein said extension and pager of the called party are activated generally simultaneously and a delayed paging activation mode wherein said pager is activated only after the voice mail system receives a paging request from the caller.

39. A method of routing an incoming call of a telecommunication system comprising the steps of:

receiving an incoming call into a private branch exchange and one of:

a) routing the call to the called party extension in a delayed mode of operation that has been user selected by the called party, and if after a predetermined time there has been no answer, transferring the calling party to a called party voice mailbox of a voice mail system that has been configured to either leave a message or page the called party via a paging system integrated with the voice mail system; or b) routing the call to an auto attendant in an immediate mode of operation that has been user selected by the called party, and simultaneously dialing the called party extension, actuating the pager, and transferring the call to the called party voice mailbox, wherein if the called party extension is not answered after a predetermined time, prompting the caller to leave a message in the voice mailbox.

40. A method according to claim 39, and further comprising the step of user configuring a delayed or immediate mode of operation such that a call to a called party is automatically processed in the selected immediate or delayed mode of operation.

41. A method according to claim 39, and further comprising the step of pressing a key in the delayed mode of operation to page the calling party, and in response, activating a secondary voice mailbox of the called party.

42. A method according to claim 41, and further comprising the step of prompting the calling party to leave a message if the call is not answered after a predetermined time.

43. An integrated telecommunication system having local paging capability comprising:

a telephone system having a private branch exchange that receives incoming calls;

an integrated voice mail system and local pager system connected to the private branch exchange, and operable in one of a delayed and intermediate mode, and comprising:

a) a delayed mode of operation that has been user selected by a called party where a call is routed to a called party extension, and if after a predetermined time there has been no answer, the call is transferred to the called party voice mailbox of a voice mail system that has been configured to either leave a message or page the called party via the paging system integrated with the voice mail system; or b) an immediate mode of operation that has been user selected by a called party where a call is routed to an auto attendant and then simultaneously transferred to the called party extension and the called party voice mailbox while actuating the pager, wherein if the called party extension is not answered after a predetermined time, the caller is prompted to leave a message in the called party voice mailbox.

44. An integrated telecommunication system according to claim 43, and further comprising a secondary mailbox of a called party which is activated in the delayed mode of operation.

* * * * *